(12) United States Patent
Grotjohn et al.

(10) Patent No.: US 7,487,464 B2
(45) Date of Patent: Feb. 3, 2009

(54) ENHANCED VISUALIZATION AND SELECTION OF MULTI-LAYERED ELEMENTS IN A CONTAINMENT HIERARCHY

(75) Inventors: David K. Grotjohn, Cary, NC (US); Lucinio Santos-Gomez, Durham, NC (US); Michael T. Stokes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/356,375

(22) Filed: Feb. 16, 2006

(65) Prior Publication Data

US 2007/0192695 A1    Aug. 16, 2007

(51) Int. Cl.
*G06F 3/048* (2006.01)
*G06F 17/00* (2006.01)
*G06F 9/44* (2006.01)

(52) U.S. Cl. .................. 715/797; 715/715; 715/766; 715/794; 715/234; 715/246; 717/105; 717/116

(58) Field of Classification Search .................. 715/713, 715/768, 790, 794–798, 964, 967, 209, 227–228, 715/234, 240, 243–244, 246, 255, 273, 275, 715/277, 711, 715, 744, 747, 759–760, 763–766, 715/769, 776–777, 788, 826, 854; 717/104–106, 717/109, 113, 102; 707/E17.01, E17.009, 707/E17.116

See application file for complete search history.

(56) References Cited

U.S. PATENT DOCUMENTS

| | | | | |
|---|---|---|---|---|
| 4,868,765 A | * | 9/1989 | Diefendorff | 715/797 |
| 5,140,678 A | * | 8/1992 | Torres | 715/777 |
| 5,412,775 A | * | 5/1995 | Maeda et al. | 715/797 |
| 5,689,666 A | * | 11/1997 | Berquist et al. | 715/797 |
| 5,835,091 A | * | 11/1998 | Bailey et al. | 715/854 |
| 5,943,053 A | | 8/1999 | Ludolph et al. | |
| 5,956,736 A | * | 9/1999 | Hanson et al. | 715/234 |
| 6,014,138 A | * | 1/2000 | Cain et al. | 715/826 |

(Continued)

FOREIGN PATENT DOCUMENTS

EP    1443421 A1    8/2004

(Continued)

OTHER PUBLICATIONS

Storey et al., "Manipulating and Documenting Software Structures using SHriMP views", Proceedings of the International Conference on Software Maintenance (ICSM '95), IEEE 1995, pp. 275-284.*

(Continued)

*Primary Examiner*—Kieu D Vu
*Assistant Examiner*—Andrew Tank
(74) *Attorney, Agent, or Firm*—Martin J. McKinley; Law Office of Jim Boice

(57) ABSTRACT

A method, apparatus and computer-usable medium for displaying multiple elements in a graphical editor, wherein the multiple elements overlap and share a common space in the graphical editor; invoking a visual affordance that opens a zoom window; and displaying the visual affordance and the zoom window in an area in the graphical editor where the multiple elements overlap, wherein the zoom window displays a visual representation that is modified to show overlapping multiple elements.

3 Claims, 15 Drawing Sheets

U.S. PATENT DOCUMENTS

| | | | |
|---|---|---|---|
| 6,040,833 A * | 3/2000 | Henshaw | 715/794 |
| 6,046,740 A * | 4/2000 | LaRoche et al. | 715/764 |
| 6,211,856 B1 | 4/2001 | Choi et al. | |
| 6,300,957 B1 | 10/2001 | Rao et al. | |
| 6,570,583 B1 | 5/2003 | Kung et al. | |
| 6,806,892 B1 * | 10/2004 | Plow et al. | 715/781 |
| 7,243,299 B1 * | 7/2007 | Rubin et al. | 715/209 |
| 7,275,063 B2 * | 9/2007 | Horn | 707/102 |
| 2002/0073396 A1 * | 6/2002 | Crupi et al. | 717/104 |
| 2004/0107268 A1 | 6/2004 | Iriya et al. | |
| 2005/0257157 A1 * | 11/2005 | Gilboa et al. | 715/747 |
| 2006/0161861 A1 * | 7/2006 | Holecek et al. | 715/782 |

FOREIGN PATENT DOCUMENTS

| | | |
|---|---|---|
| JP | 02004285 A2 | 1/1990 |
| JP | 02247772 A2 | 10/1990 |
| JP | 02249059 A2 | 10/1990 |
| JP | 08263255 A2 | 10/1996 |
| JP | 2003036439 A2 | 2/2003 |

OTHER PUBLICATIONS

Eidenberger et al., "VizIR—a framework for visual information retrieval", Journal of Visual Languages & Computing, vol. 14, No. 5., Oct. 2003, pp. 443-469.*

Williams, "Java IDE—The Case for Using Eclipse Technology in General Purpose Applications", Internet Archive Wayback Machine: http://www.myeclipseide.com/java-ide.htm, Dec. 4, 2004, pp. 1-6.*

* cited by examiner

ENHANCED VISUALIZATION AND SELECTION OF MULTI-LAYERED ELEMENTS IN A CONTAINMENT HIERARCHY

BACKGROUND OF THE INVENTION

The present invention relates in general to the field of computers and similar technologies, and in particular to software utilized in this field.

An Integrated Development Environment (IDE) is computer software used to help computer programmers develop code. IDEs normally include a source code editor (either a text or modeling-language-based editor in a first window of a User Interface—"UI"), a compiler and/or interpreter (underlying software not shown in the UI), build-automation tools (including modeling languages) and a debugger (in a second window in the UI). The UI often includes a class browser, an object inspector and a class hierarchy (tree) diagram for use with object oriented software development.

Visual editors are the tool of choice for designing application UI's. Such visual editors utilize modeling-language-based editors as described above. UI elements are added to the editor and are manipulated by selecting a visual element (which is modeling-language-based) and changing its properties.

For visual editing tasks in which content is multi-layered in nature (e.g., table oriented content), visualization and selection of individual elements in the content containment hierarchy becomes increasingly difficult as the complexity of the containment hierarchy increases. For example, in most What-You-See-Is-What-You-Get (WYSIWYG) visual editors, the visualizations of container objects are usually small, often only a few pixels tall. These visualizations are this small because this is how the object will be displayed at runtime, or, if they are not displayed at all at runtime, because of limited real estate on the screen during the code editing process. Oftentimes, there are multiple levels of containers (e.g., tables within tables), wherein there is very little space between containers. That is, the containers may have a little as one pixel between them, or they may actually be on top of each other (no pixels between them). Therefore, the hotspot for selecting one container versus another may only be a matter of one or a few pixels. For example, consider the IDE window 100a shown in FIG. 1a View 100a, shown in FIG. 1a, depicts a Table A as a 3×3 table. The top left cell of Table A contains a Table B, which is visually obscured in a visual display by Table A. Table B, as shown in view 100b of FIG. 1b, is a 2×2 table. The top left cell of Table B contains Table C, which is also a 2×2 table, but which is obscured by Table B (and Table A). Trying to select the top left cell of Table A versus the top left cell of Table B, for example, is very difficult. As depicted, the very top left corner of view 100a contains borders for each table, as well as the top row of each table, as well as the top left cell of each table. Thus, there is no way to distinguish between the borders of the table, the row or the cell, because they appear to be the same. Furthermore, at runtime in and IDE environment, only one border is visible. Nonetheless, during development, a particular (single) table, row or cell you may need to be selected, but cannot due to the obscuring problem just stated. Furthermore, many "What-You-See-Is-What-You-Get" (WYSIWYG) editors will not display any visual representation of some containers (in order to adhere to WYSIWYG display), making their visual selection even more difficult (as shown, for example, FIG. 2a discussed below).

Similar issues exist for non-IDE environments, including visual editors used in engineering, business software and productivity applications to create presentations, diagrams, models and engineering blueprints. Such non-IDE environments include software applications such as PowerPoint®, Visio®, workflow editors, architecture design software and Computer Aided Design (CAD) software.

SUMMARY OF THE INVENTION

To address the need described above for way to selectively provide affordance to physically proximate and/or overlapping containers/blocks, the present invention provides a method, apparatus and computer-usable medium for displaying multiple elements in a graphical editor, wherein the multiple elements overlap and share a common space in the graphical editor; invoking a visual affordance that opens a zoom window; and displaying the visual affordance and the zoom window in an area in the graphical editor where the multiple elements overlap, wherein the zoom window displays a visual representation that is modified to show overlapping multiple elements.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2b illustrates a Zoom Widget that presents a zoomed window showing the underlying objects of the container shown in FIG. 2a;

DETAILED DESCRIPTION OF THE PREFERRED EMBODIMENT

Figure 1A:
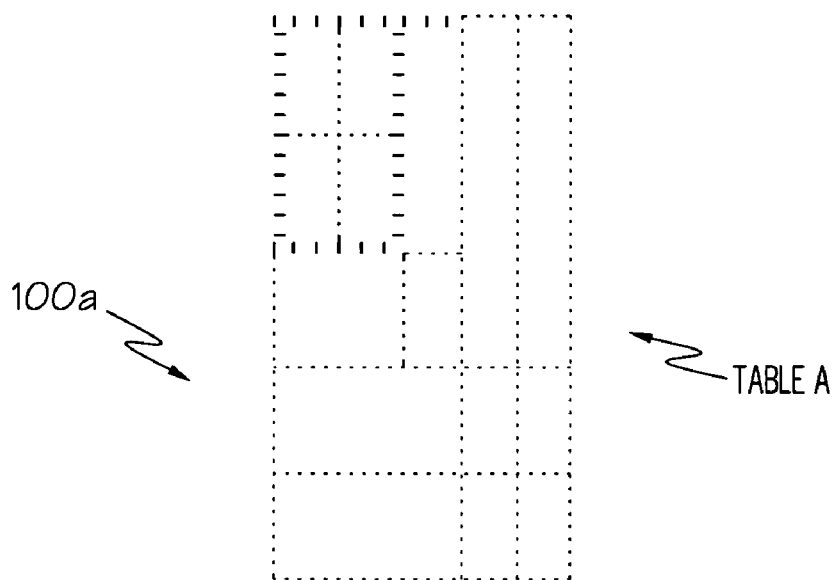
FIGS. 1a-1b illustrate typical prior art container graphics that make access of proximately located containers difficult.
Figure 1B:
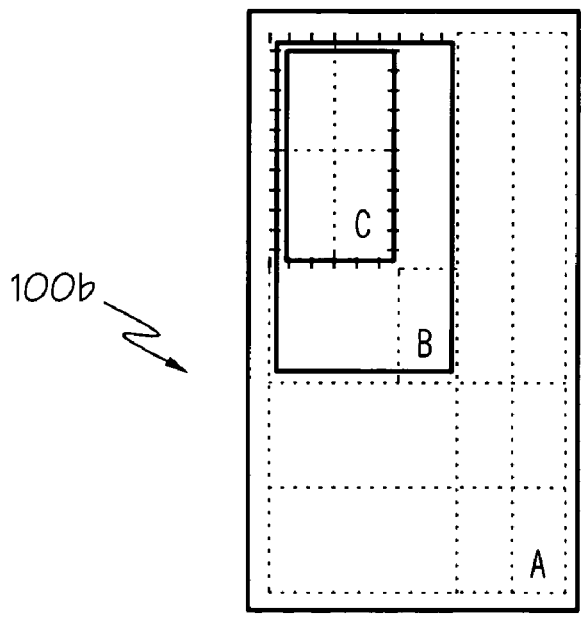

A method, apparatus and computer-usable medium is presented for a Zoom Widget that a) facilitates visualization of containment relations among layered graphical objects; and b) facilitates selection (and invocation of other actions) on visual elements in a containment hierarchy. When working in a visual editor, an affordance in the form of a magnifying glass icon (the Zoom Widget) is presented on anything (including a container) that is multi-layered. Clicking on the magnifying glass causes a zoom window to open in which an enlarged presentation of containment relationships behind a container is shown. When zoomed open, the different containment objects have adequate physical on-screen space between them to allow the containment objects to be named/renamed, re-ordered in a hierarchy, viewed, or otherwise manipulated. Note that in a preferred embodiment, the Zoom Widget is displayed in the upper corner of the outmost object (or cell) for every object that contains at least one other object. While the zoom window contains an enlarged presentation of the objects (or container or cells), the zoom window may be customized to identify the different objects (e.g., objects that were previously not shown may be shown, close or overlapping borders may be split apart, different objects may be labeled, etc.). For example, if the objects really do share a border, then zooming in will not help unless the shared border is split apart, as disclosed in the present specification. Thus, the present disclosure presents a method for selecting specific objects for further manipulation though normal editing means.

Thus, to address the need described above for a way to visualize and select overlapping elements in a graphical editor, the present invention provides a method, apparatus and computer-usable medium for displaying a zoom mechanism that magnifies and enhances the visualization and manipulation of the overlapping objects which otherwise would remain hidden. The zoom mechanism is enabled when two or more elements in a graphical editor share common space in the editor, and it is invoked via a visual affordance, which opens a zoom window. Both the affordance and the subsequent zoom window appear in the area where the objects overlap. In the preferred implementation, the zoom window displays a visual representation that is similar to the original display, but modified as necessary to show each of the overlapping elements, so that they can be selected or acted upon. This may include "breaking apart" and enlarging sections of the overlapping objects as necessary to that they can be selected and manipulated individually (e.g., to shown two different containers with shared borders), and labeling each object. Furthermore, in one embodiment, a display size of the Zoom Widget and/or the zoom window is automatically determined (made larger or smaller) by a quantity of graphical representations (e.g., overlapping elements) that have a common border.

Note that while a preferred embodiment of the present invention is described and depicted in exemplary manner in use with an Integrated Development Environment (IDE), the novel features described herein are useful in any visual editor environment, including but not limited to visual editors used in engineering development applications, business software and productivity applications used in the creation of presentations, diagrams, models and engineering blueprints. Examples of such applications include, but are not limited to, PowerPoint®, Visio®, workflow editors, architectural design software and Computer Aided Design (CAD) software. Thus, the presently described invention applies wherever objects rendered in a visual editor share any real estate in a multi-layered space. At one extreme, objects may share just a common border. At the other extreme, the objects overlap completely. The present invention provides a method and means for handling both extremes.

Figure 2A:
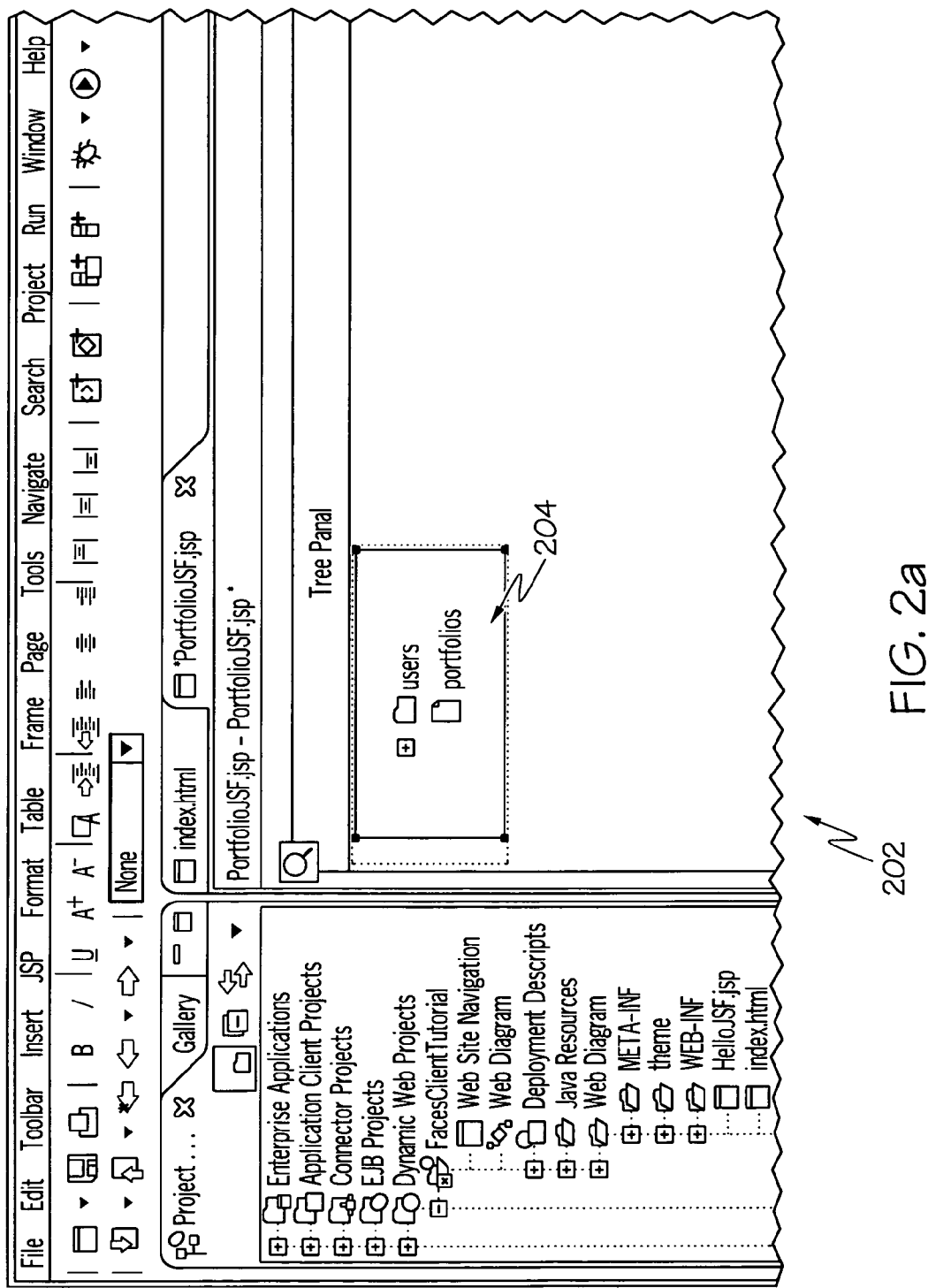
FIG. 2a depicts a graphical representation of a container that contains underlying objects in a containment chain.

Referring now to FIG. 2a, there is depicted a software development platform IDE screen 202, which shows a container graphic 204 in an editor window of the IDE screen 202. Although container graphic 204 has multiple sub-tables (sub-layers), without the invention described below, the only visible layer is that of graphic 204 as shown. Note that while "sub-tables" are used for exemplary purposes, it is understood that that present invention is applicable to any object. Note also that, in addition to the object depicted in container graphic 204 being visible (as the outer-most container), it is unclear, without using the Zoom Widget described herein, which specific container is actually being displayed.

Figure 2B:
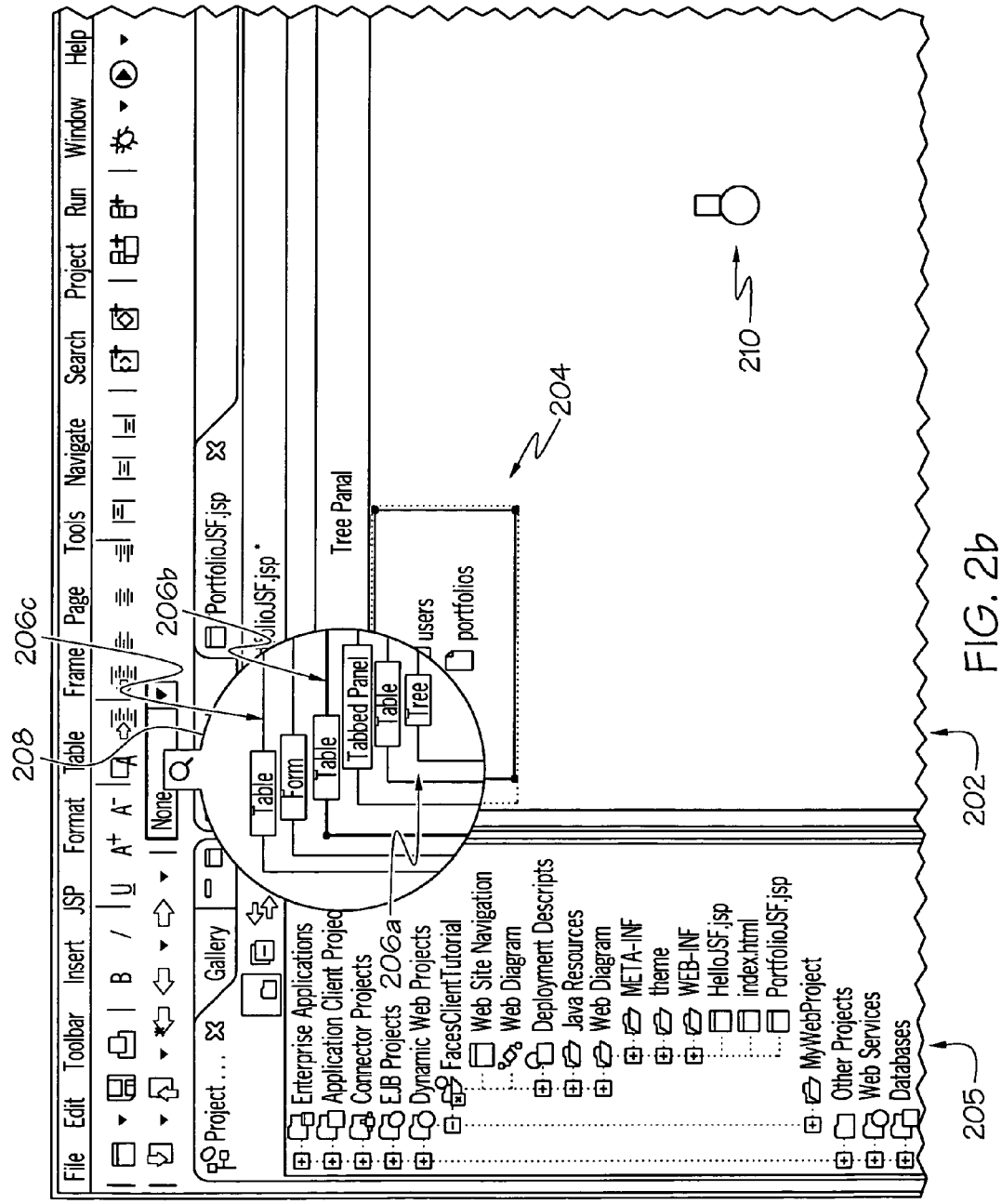

Referring now to FIG. 2b, an illustration is provided of a zoomed partial view that enables the identification of objects overlayed in the zoomed space. The Zoom Widget provides affordances for selecting overlaying objects. The affordances presented in the zoomed view can allow for the objects manipulation (e.g., moving) and invocation of action against specific overlaying objects (e.g., context menus.) As shown in FIG. 2b, container graphic 204 is a graphical representation of a java server page named PortfolioJSF.jsp, shown in tree diagram 205. PortfolieJFS.jsp is actually a series of nested container objects, with each object (except the "Tree" described below) containing another object. Note that different containers that make up the page, shown as graphic 204, are not represented visually, thus making the task of selecting one of them even harder. Container graphic 204 has an underlying container chain, shown in FIG. 2b as containment layers 206a-c, which is made visible by a Zoom Widget (ZW) 208. Containment layer 206a is the layer depicted by the front graphical representation of the table titled "Tree," and where containment layer 206b is the layer depicted by a back graphical representation of the table titled "Tabbed Panel," and where containment layer 206c is the layer depicted by a farthermost back graphical representation of the table titled "Form." That is, containment layers 206 correspond to a data structure for the java server page PortfoliaJSF.jsp, in which the table tree contains the tabbed panel table, which contains a form, which contains another table, which contains a table panel, etc. Thus, the relative positions of the containment layers 206 correspond to the hierarchical relationship between the different tables described.

In a preferred embodiment, Zoom Widget 208 is created with software that has the intelligence to provide on-screen manipulation ability of the containment layers 206. For example, while Zoom Widget (ZW) 208 is active (such as by dragging a magnifying glass icon representing ZW 208 over the upper left corner of container graphic 204 and then clicking that icon, ZW 208 becomes active, displaying the contents of the (totally or partially) obscured back graphical representations of containment layers 206), then containment layers 206 can be re-named (by clicking on the title area of the graphical representation), or re-ordered in a containment hierarchy. To re-order a containment layer 206, a selected containment layer 206 is simply dragged in front of or behind another containment layer 206. This action re-defined the hierarchal position of the dragged containment layer 206. Thus, if containment layer 206c were dragged in front of containment layer 206b, then the form table would depend on the tabbed panel table (which is now higher in the containment chain). While the operations of renaming and re-ordering are described for exemplary purposes, the present invention provides a method for selecting any object for action, such as modifying the object's properties, moving the objects via drag and drop, etc.

In a preferred embodiment, each of the containment layers are graphically coded (either by color, or fill pattern, or by any other graphically distinct display) to designate the hierarchy position of the containment layers 206. For example, assume that container graphic 204 is for a Java Server Page (JSP) file as described. Thus, the containment layers 206 depicted correspond to servlets in a containment chain for the JSP file. The relative hierarchical position from the top of the chain is graphically coded. This graphical coding changes when a containment layer 206 is dragged to a different hierarchical layer.

Preferably, the physical size (on the GUI screen real-estate) of the zoomed space (which is zoomed by ZW 208) is automatically adjusted according to how many underlying (back) graphical representations of containment layers 206 exist. That is, the size of the zoom window is optimized to show all objects in a containment chain. Size is calculated by an algorithm which determines the outermost selectable object in the containment hierarchy of the visual element in focus. Thus, if there are only two back containment layers 206, then ZW 208 is smaller than if there are three back containment layers 206, thus providing more pixel room for accessing and manipulating the back graphical representations. Similarly, when ZW 208 is activated (e.g., by clicking the magnifying glass icon), the titles of the graphical representations are automatically presented, as shown in FIG. 2b. Note also Close Affordance Widget (CAW) 210, which may be clicked to close the zoom feature in the window.

In one embodiment, ZW 208 is automatically placed where there are two or more overlaying objects at a location that is common to all layered objects, preferably at a point where the borders of the largest number of overlaying objects intersect. Such placement optimizes the use of ZW 208 by placing it where it is most needed.

For the example shown in FIG. 2b, underlying code (for a very simplified example) may look like the following:

```
<table id="table1" . . . >
    <tr><td>
        <h:form id="Portfolio". . . >. . .
            <table id="table2" . . . >
                <tr><td>
                    <odc:tabbedpanel id="tabbedpanel" . . . >
                        <table>
                            <tr><td>
                                <odc:tree id="tree1". . . >
                                . . .
                                </odc:tree>
                            </td></tr>
                        </table>
                    </odc:tabbedpanel>
                </td></tr>
            </table>
        </h:form>
    </td></tr>
</table>
```

Figure 3:
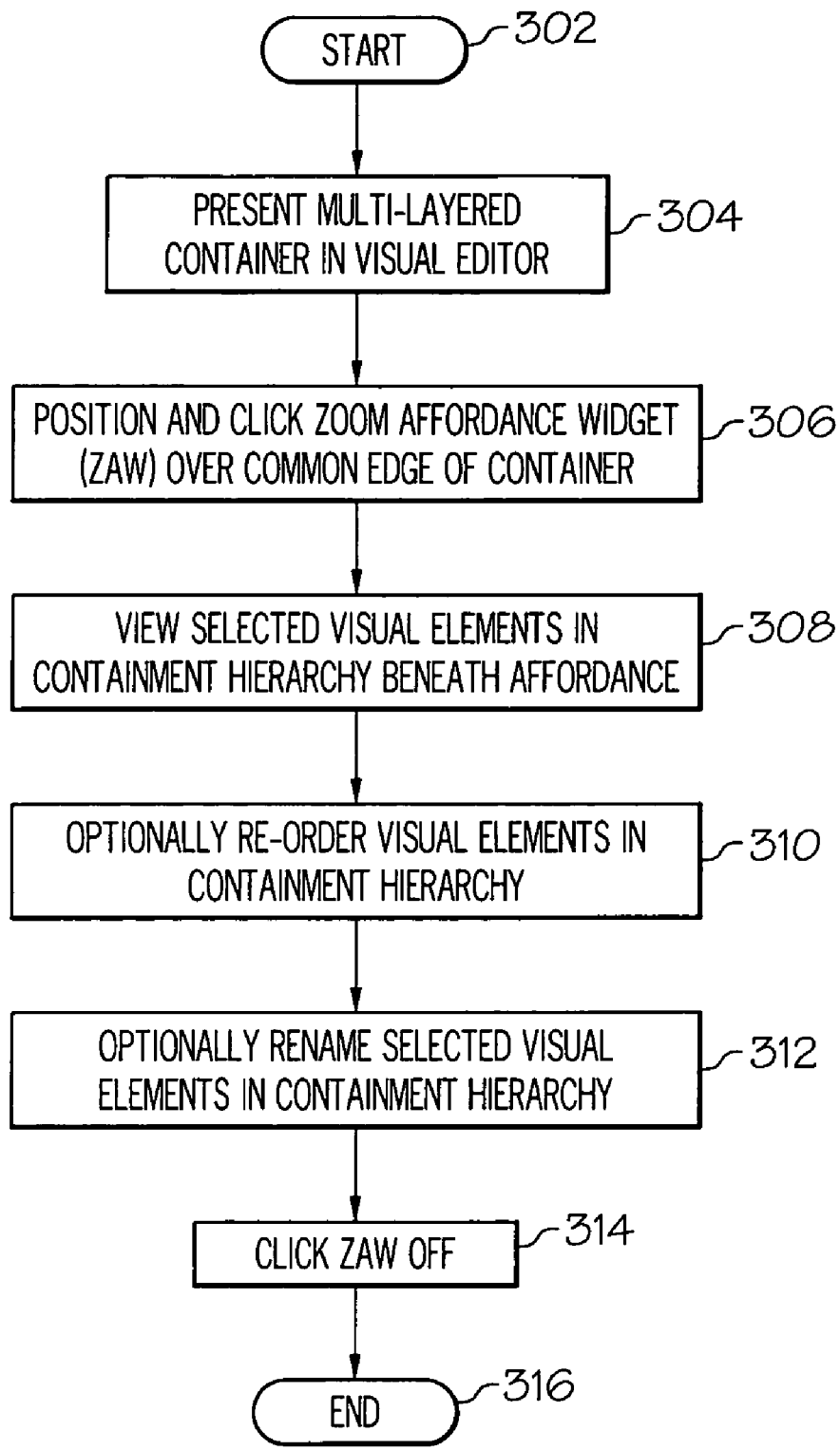
FIG. 3 is a flow-chart of exemplary steps taken to create and utilize the Zoom Widget shown in FIG. 2b.

Referring now to FIG. 3, a flow-chart of exemplary steps taken to utilize the ZW 208 is presented. After initiator block 302, a multi-layered container (such as container graphic 204) is presented (block 304) in a visual editor (such as shown in FIG. 2a). As described in block 306, the Zoom Widget (ZW) is then positioned over a common edge of the multi-layered container (i.e., where the containment layers 206 are on top of each other, as shown in FIGS. 2a-b).

Each of the containment layers can then be viewed (block 308), including their hierarchical order, titles, etc. Optionally, each of the containment layers can be re-ordered in the hierarchy (block 310) by dragging them to a new position in the graphical representation. Note that in one embodiment, the containment layers are not actually re-ordered logically, but rather are simply displayed differently (and not necessarily WYSIWYG) in order to easily distinguish the objects. However, in another embodiment, moving the containment layers logically re-orders them as well. In addition, the containment layers can be renamed (block 312). When the back graphical representations have been viewed, renamed, re-ordered, etc., then the ZW 314 is clicked off (block 314), and the process end (terminator block 316).

Figure 4:
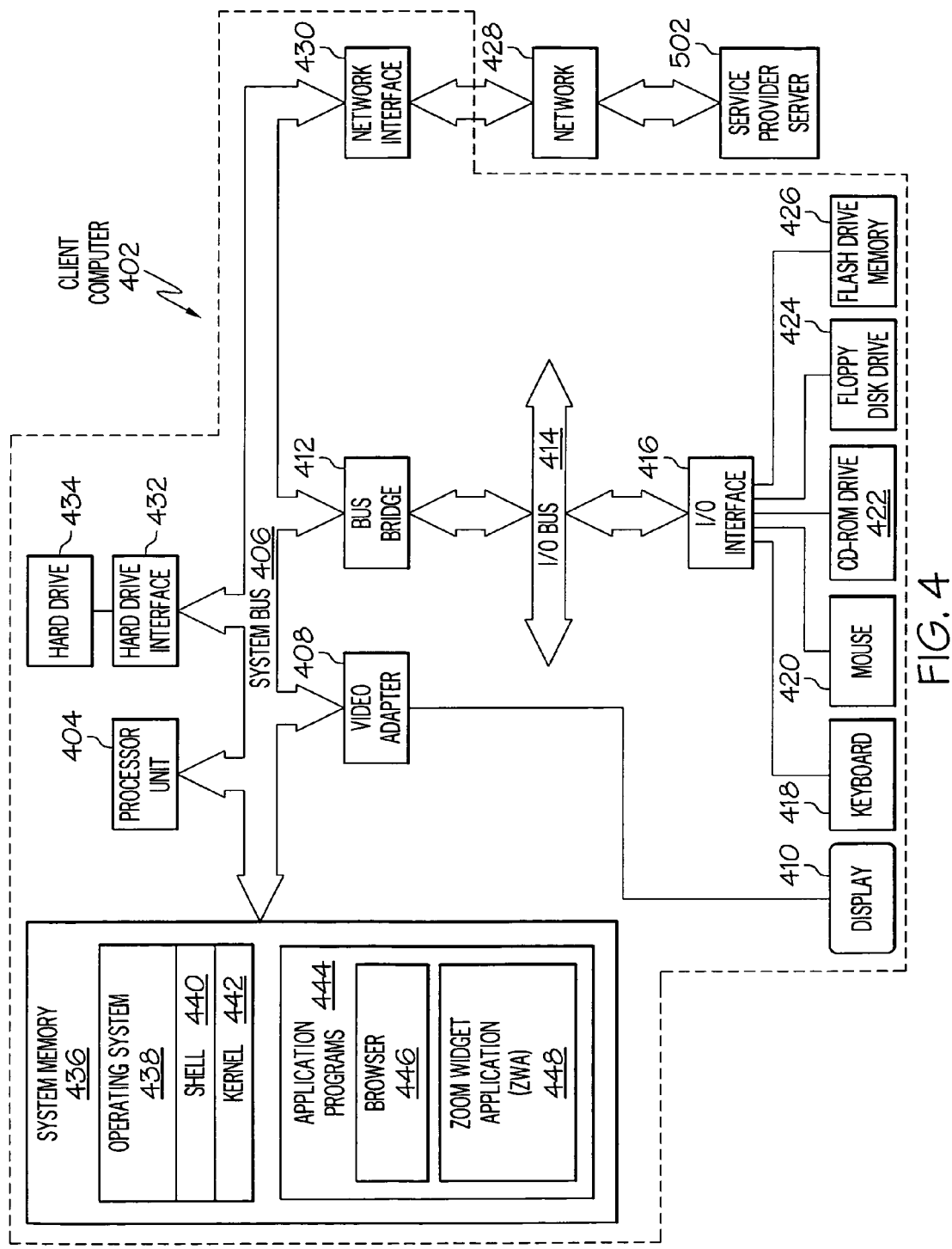
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Zoom Widget Application (ZWA) 448. ZWA 448 includes code for implementing the processes described in FIGS. 1b-3. In one embodiment, client computer 402 is able to download ZWA 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
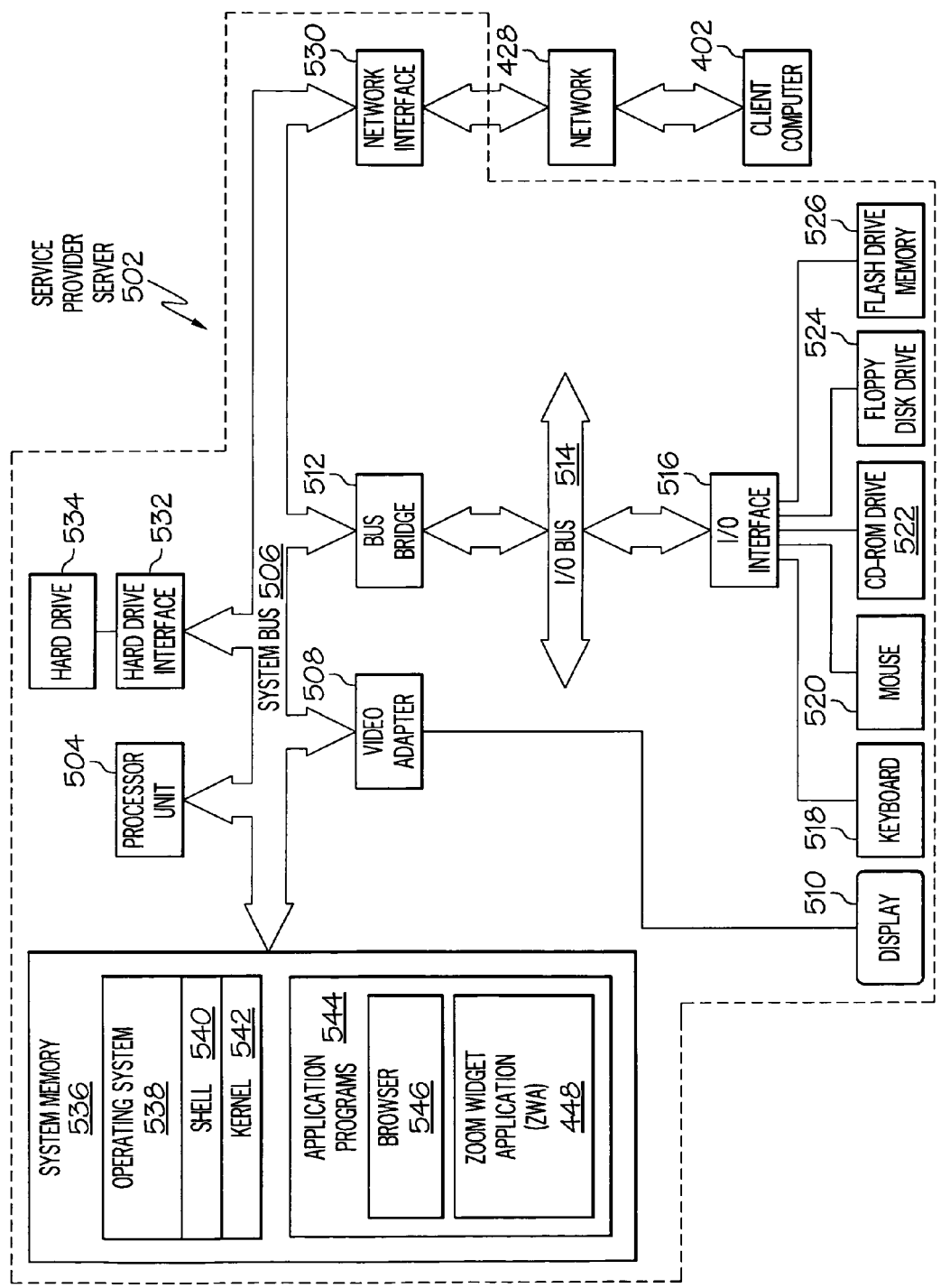
FIG. 5 illustrates an exemplary server from which software for executing the present invention may be deployed and/or implemented for the benefit of a user of the client computer shown in FIG. 4.

As noted above, ZWA 448 can be downloaded to client computer 502 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download ZWA 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of ZWA 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of ZWA 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of ZWA 448, are performed by service provider server 502. Alternatively, ZWA 448 and the method described herein, and in particular as shown and described in FIGS. 2a-3, can be deployed as a process software from service provider server 502 to client computer 402. Still more particularly, process software for the method so described may be deployed to service provider server 502 by another service provider server (not shown).

Figure 6A:
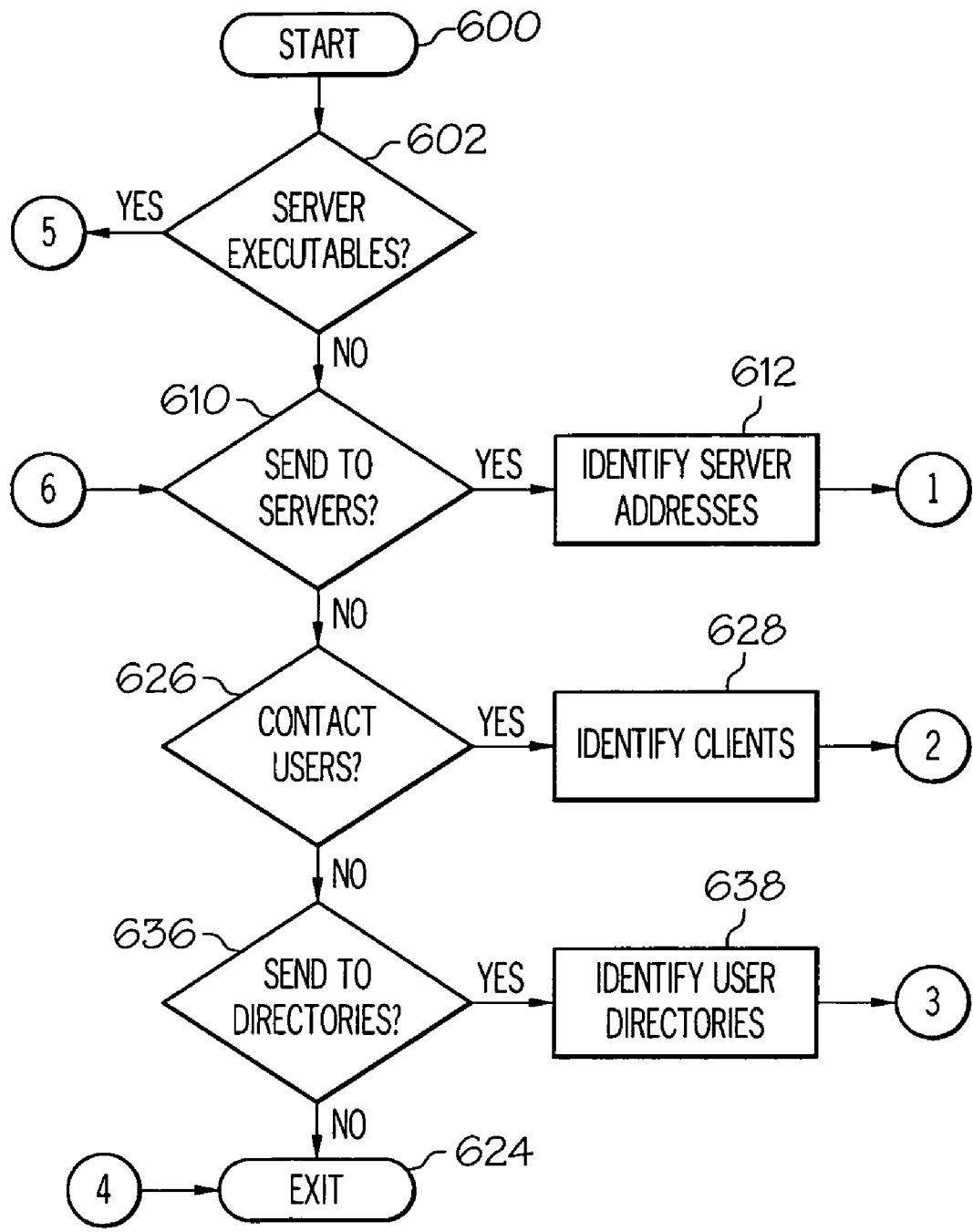
FIGS. 6a-b show a flow-chart of steps taken to deploy software capable of executing the steps shown and described in FIGS. 2a-3.
Figure 6B:
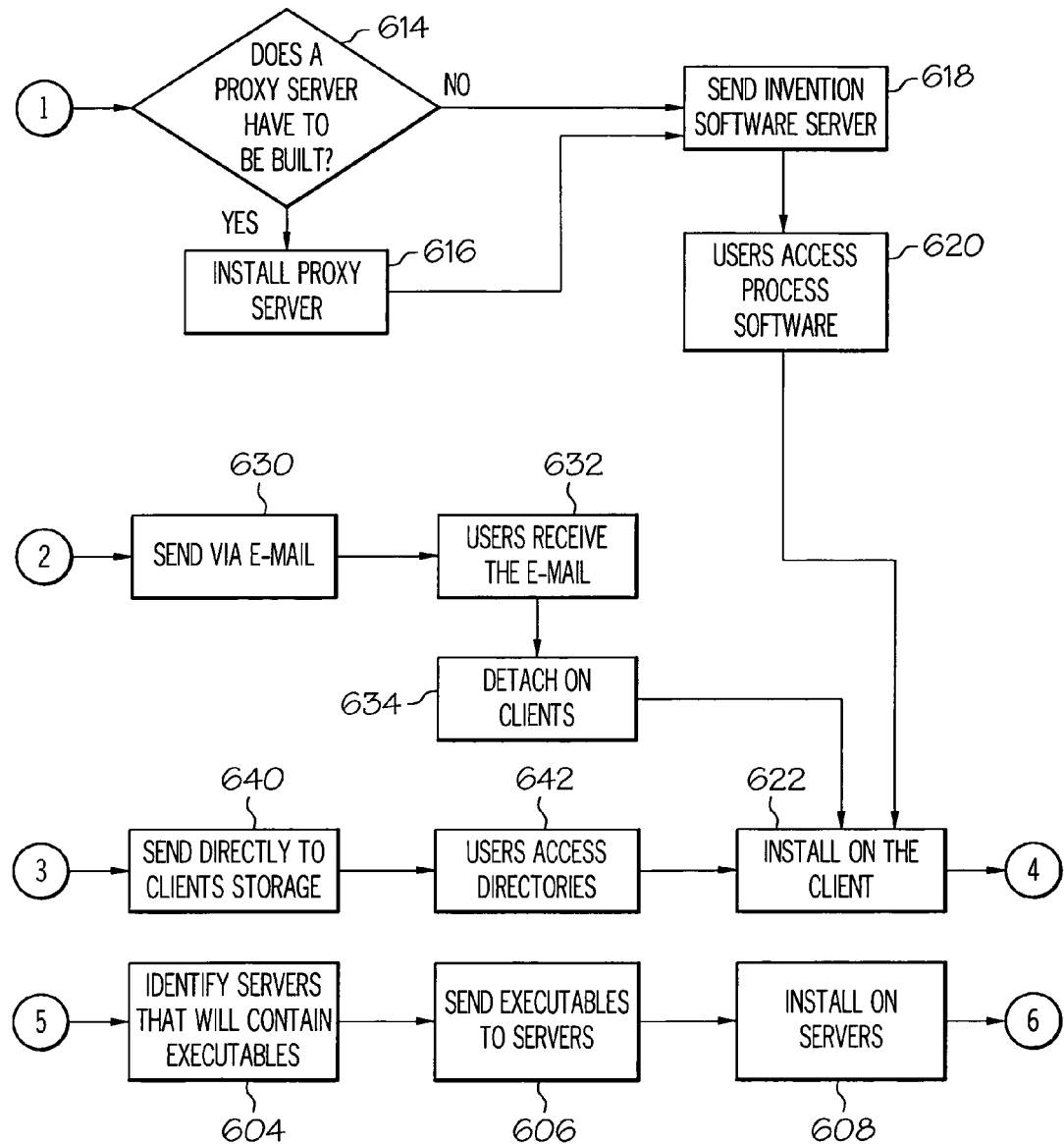

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 7A:
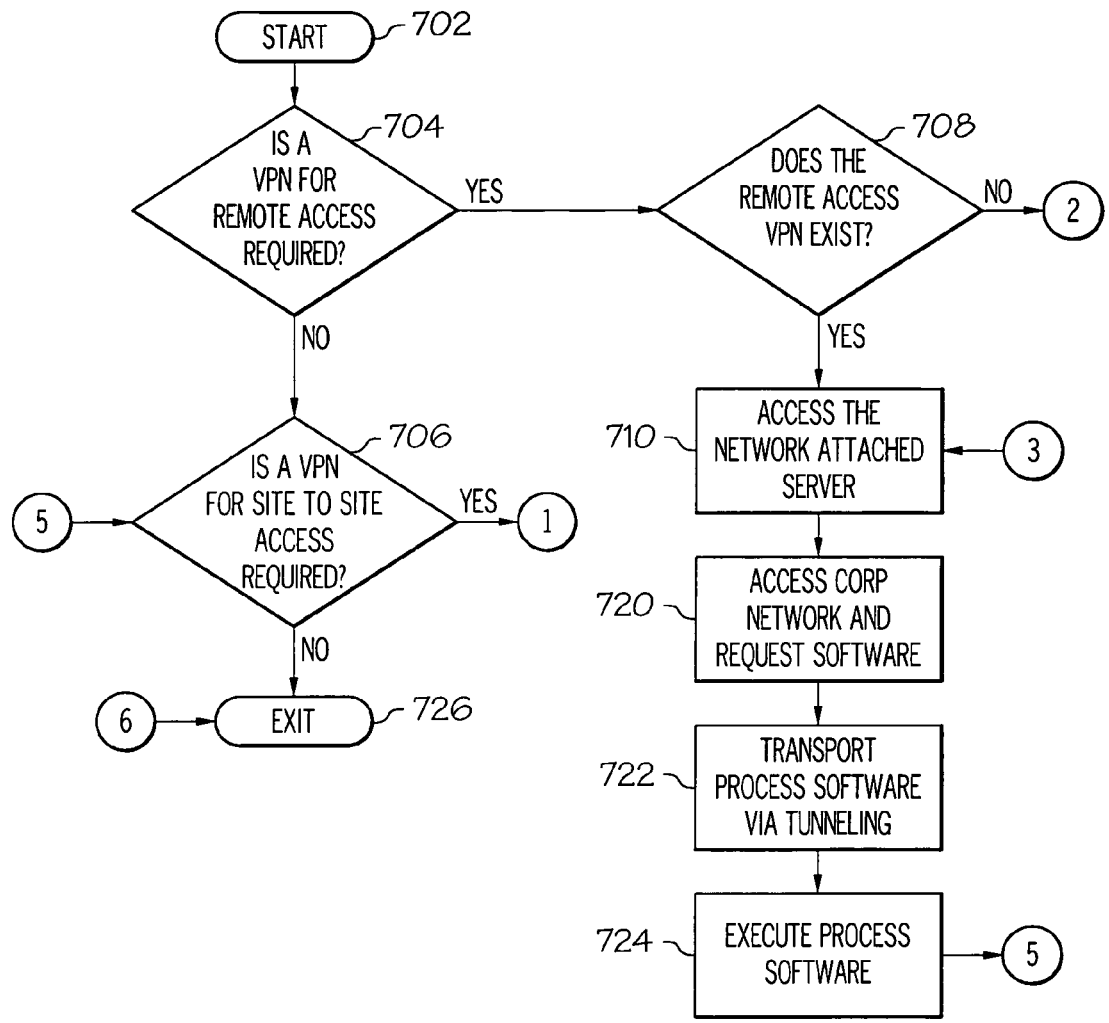
FIGS. 7a-c show a flow-chart of steps taken to deploy in a Virtual Private Network (VPN) software that is capable of executing the steps shown and described in FIGS. 2a-3.
Figure 7B:
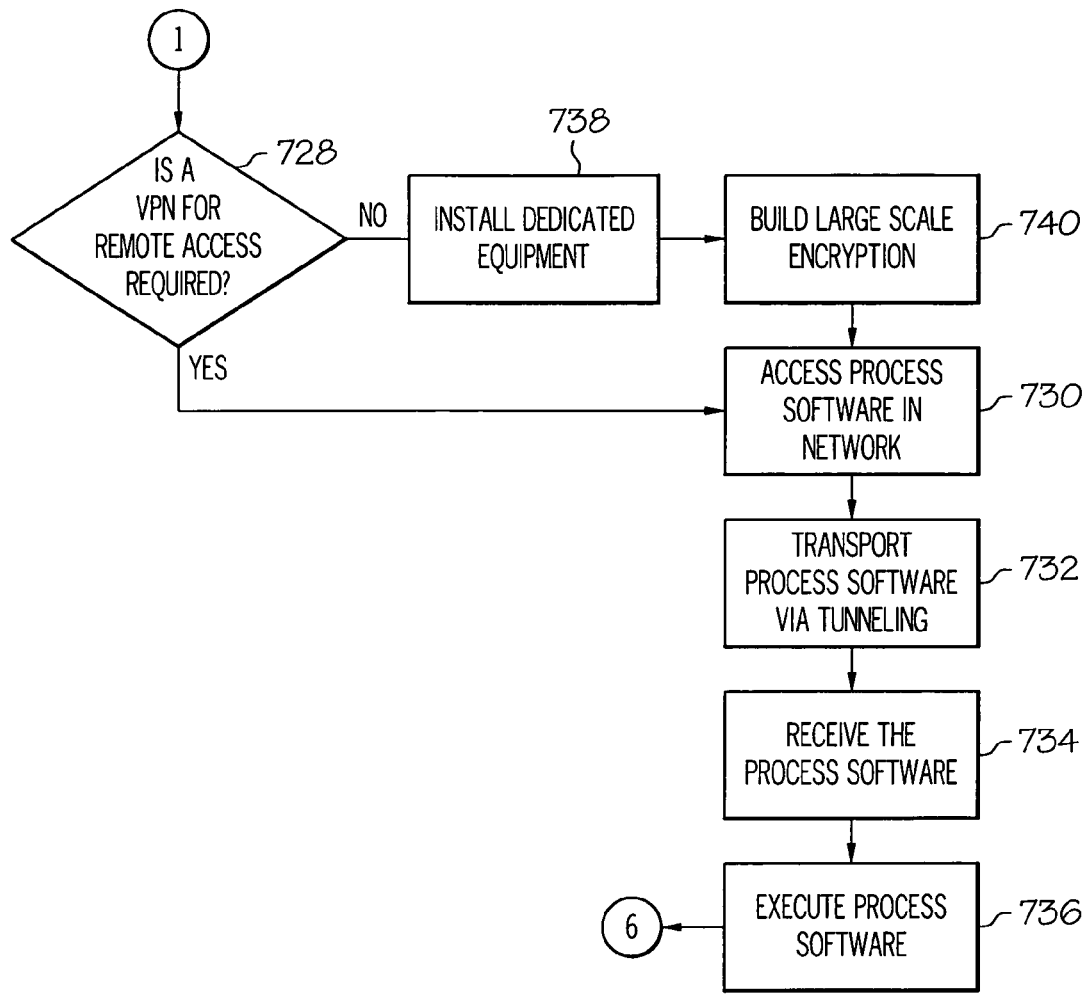
Figure 7C:
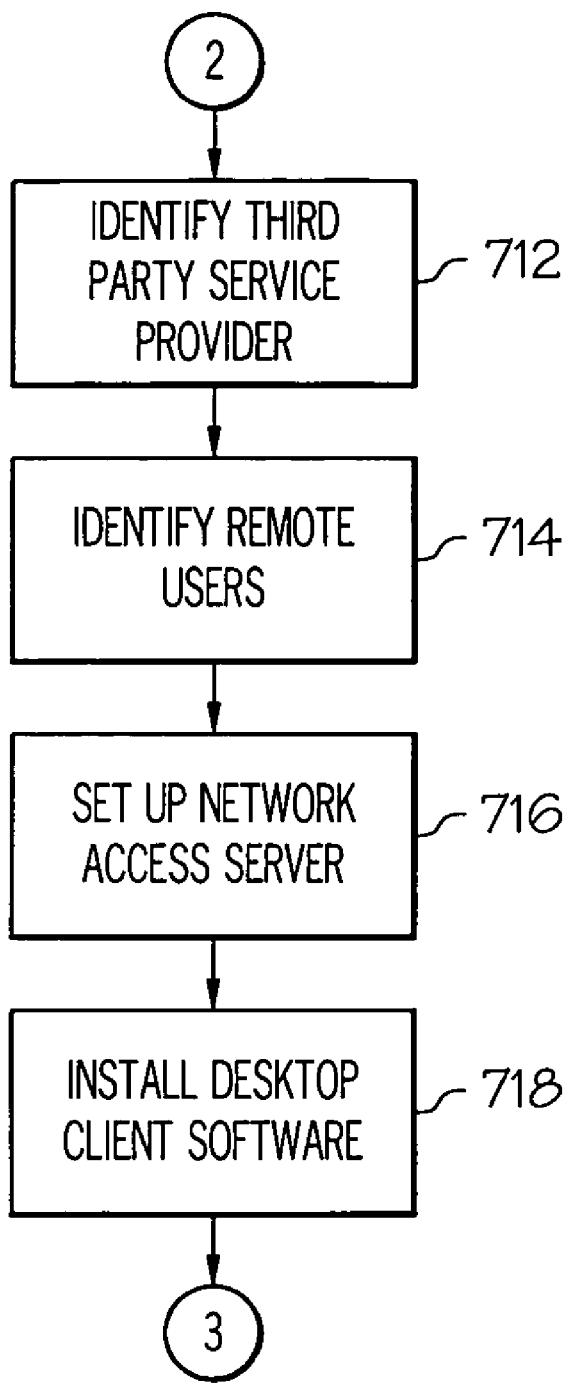

The process for such VPN deployment is described in FIG. 7. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desk-top, it is removed from the packets, reconstituted and then is executed on the remote users desk-top (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
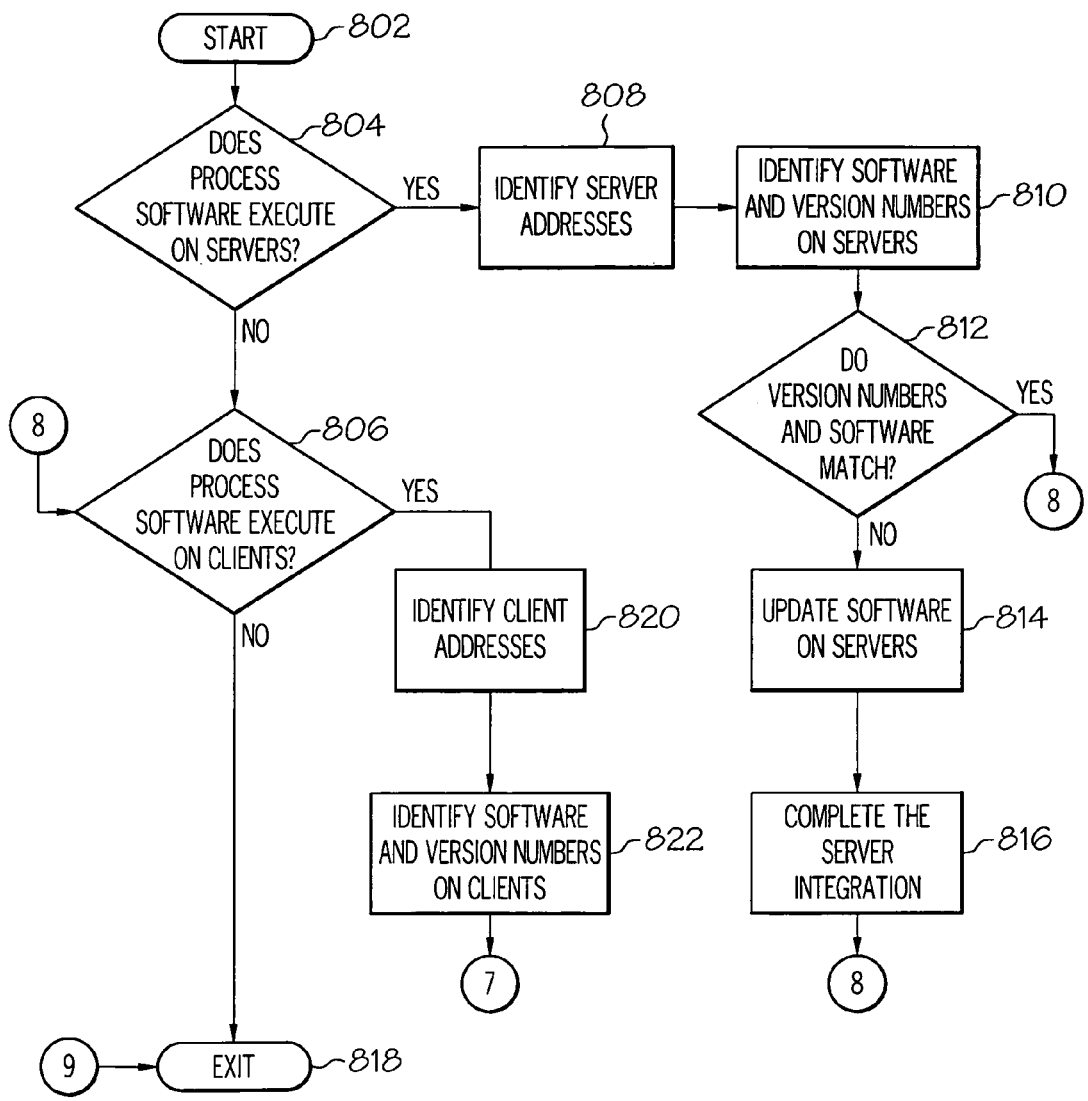
FIGS. 8a-b show a flow-chart showing steps taken to integrate into a computer system software that is capable of executing the steps shown and described in FIGS. 2a-3.
Figure 8B:
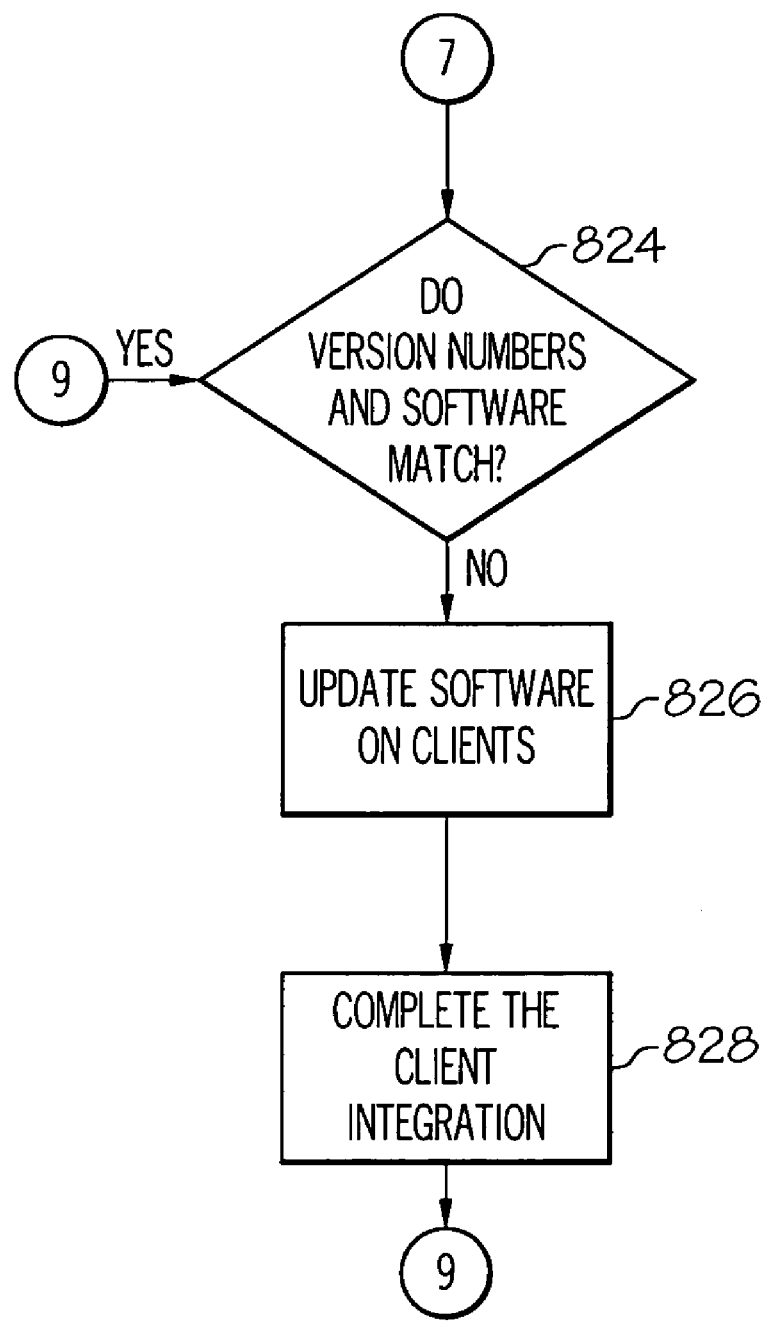

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
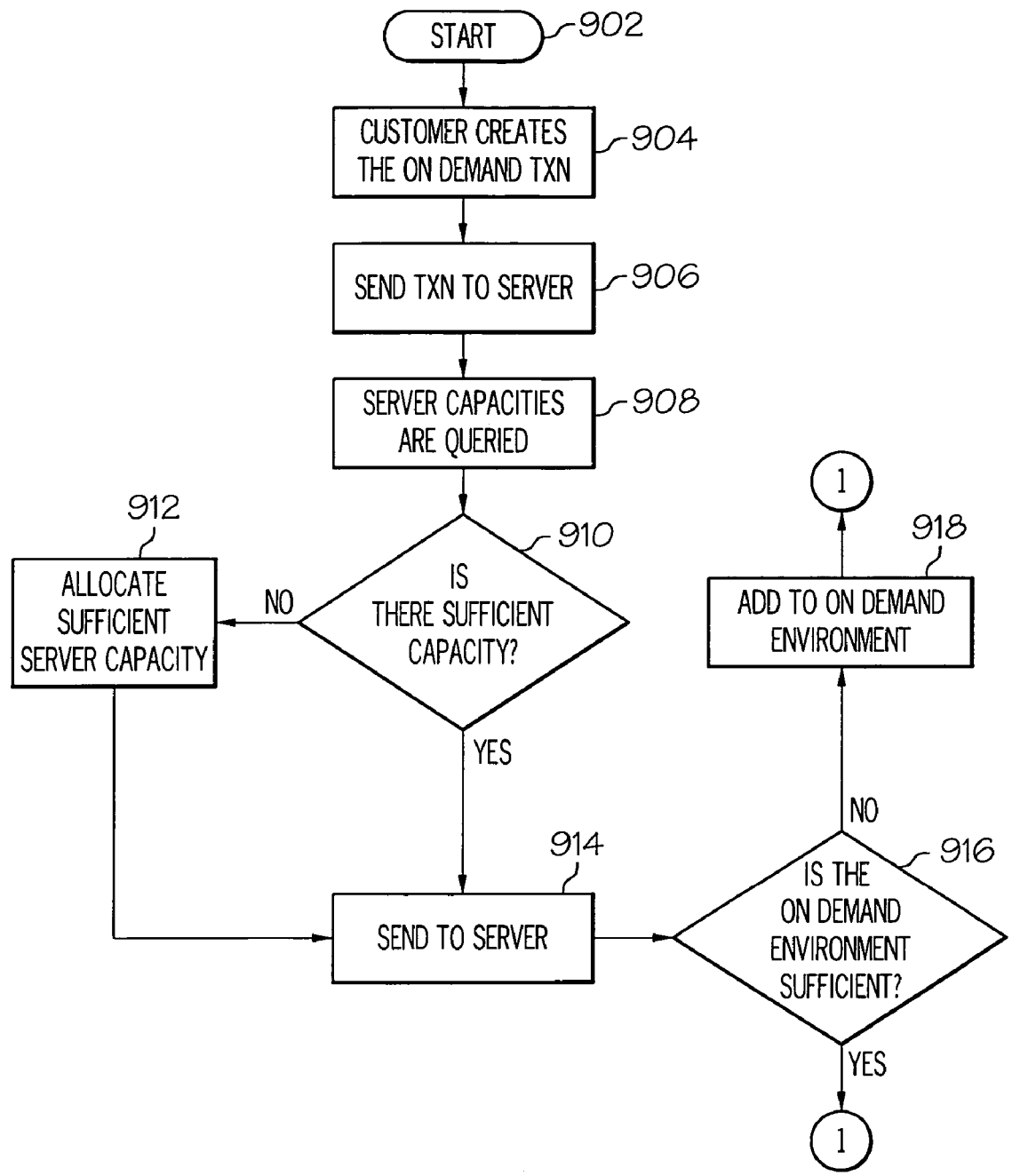
FIGS. 9a-b show a flow-chart showing steps taken to execute the steps shown and described in FIGS. 2a-3 using an on-demand service provider.
Figure 9B:
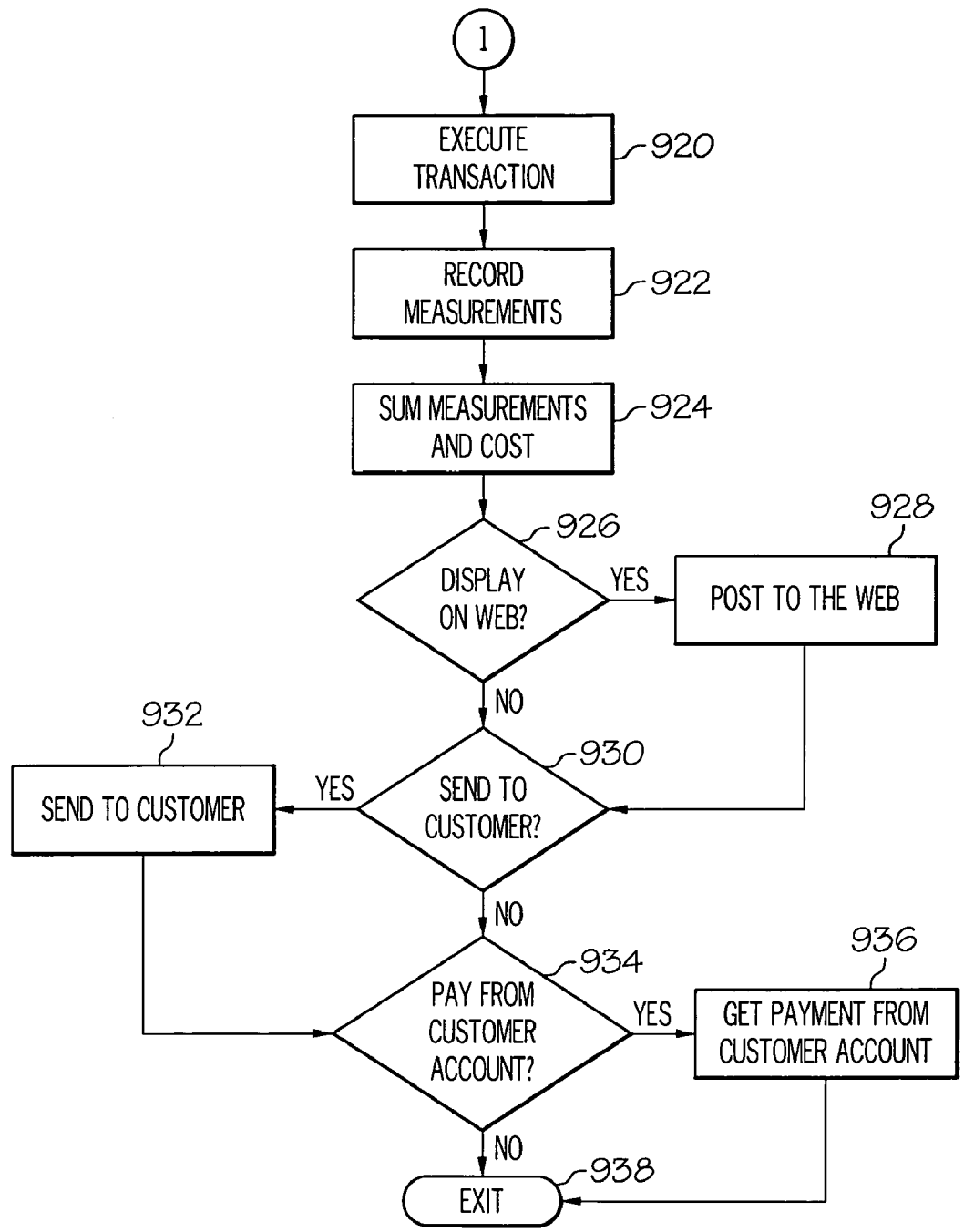

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. For example, while the present invention has been described in the context of an Integrated Development Environment (IDE), in which containers are accessed. However, the present invention is also useful in any graphic interface in which shapes overlap one another. For example, if two tables in a PowerPoint® or Word® document are on top of each other in a manner that makes it difficult or impossible to "peek" at the underlying (covered) table, the presently described zoom affordance icon can be used in a similar manner in such applications.

The present disclosure thus presents, inter alia, a way to selectively provide an affordance to visually distinguish and graphically select physically proximate and/or overlapping containers/blocks. The method allows for the display of an affordance for a Zoom Widget at a common border between two or more graphical representations. The Zoom Widget displays in front of the original graphical display, visually obscuring at least part of the original display. The Zoom Widget displays at least part of the original display, and displays the objects/borders in a larger size and/or with borders artificially separated and/or with each object labeled, in order to make it easier to visually distinguish and visually select a specific object/border. A WYSIWYG display will be broken as necessary to meet this goal. In a preferred implementation, the zoom area displays an artificial representation just good (realistic) enough for the specific purposes of a) showing containment and b) allowing for selection switching, and c) invoking actions on objects. This may include "breaking apart" objects as necessary (e.g., to show two different containers with shared borders), and labeling each object.

Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:

displaying a table in a graphical editor, wherein multiple elements of the table overlap and share a common space in the graphical editor such that only a top element is initially visible and lower elements are initially not visible in the common space in the graphical editor;

invoking a visual affordance that opens a zoom window, wherein the visual affordance is displayed in an upper corner of the top element;

displaying the visual affordance and the zoom window in an area in the graphical editor where the multiple elements overlap, wherein the zoom window displays a modified visual representation that is modified to show overlapping multiple elements of the table that are not initially visible in the graphical editor, wherein the modified visual representation contemporaneously displays all of the multiple elements of the table, wherein each of the multiple elements are displayed as a same relative size to one another, wherein the modified visual representation is automatically sized according to a quantity of elements in the table that are displayed in the modified visual representation, and wherein the modified visual representation that shows a greater number of elements in the table is larger than the modified visual representation that shows a lesser number of elements in the table;

while presenting the modified visual representation, visually splitting apart elements that have a shared border when displayed in the common space of the graphical editor, wherein the elements that have the shared border were displayed, in the common space of the graphical editor before invoking the zoom window and before visually splitting apart the elements of the table, in a manner such that only a view of the top element was visible;

labeling and color-coding every element in the table according to a logical order of the elements of the table;

automatically presenting a label and color-coding for each element in the table in the modified visual representation; and reordering a visual representation of a visual top-to-bottom order of the elements by receiving a drag-and-drop of a selected element from an original position to a user-selected hierarchical position in the table, wherein the logical order of the elements remains unchanged and does not correspond with the visual top-to-bottom order, and wherein previously obscured elements of the table are visible while the reordering is performed.

2. A system comprising:
a processor;
a data bus coupled to the processor;
a memory coupled to the data bus; and
a computer-usable medium embodying computer program code, the computer program code comprising instructions executable by the processor and configured for:
displaying a table in a graphical editor, wherein multiple elements of the table overlap and share a common space in the graphical editor such that only a top element is initially visible and lower elements are initially not visible in the common space in the graphical editor;
invoking a visual affordance that opens a zoom window, wherein the visual affordance is displayed in an upper corner of the top element;
displaying the visual affordance and the zoom window in an area in the graphical editor where the multiple elements overlap, wherein the zoom window displays a modified visual representation that is modified to show overlapping multiple elements of the table that are not initially visible in the graphical editor, wherein the modified visual representation contemporaneously displays all of the multiple elements of the table, wherein each of the multiple elements are displayed as a same relative size to one another, wherein the modified visual representation is automatically sized according to a quantity of elements in the table that are displayed in the modified visual representation, and wherein the modified visual representation that shows a greater number of elements in the table is larger than the modified visual representation that shows a lesser number of elements in the table;
while presenting the modified visual representation, visually splitting apart elements that have a shared border when displayed in the common space of the graphical editor, wherein the elements that have the shared border were displayed, in the common space of the graphical editor before invoking the zoom window and before visually splitting apart the elements of the table, in a manner such that only a view of the top element was visible;
labeling and color-coding every element in the table according to a logical order of the elements of the table;
automatically presenting a label and color-coding for each element in the table in the modified visual representation; and
reordering a visual representation of a visual top-to-bottom order of the elements by receiving a drag-and-drop of a selected element from an original position to a user-selected hierarchical position in the table, wherein the logical order of the elements remains unchanged and does not correspond with the visual top-to-bottom order, and wherein previously obscured elements of the table are visible while the reordering is performed.

3. A tangible computer-usable medium on which is stored computer program code, the computer program code comprising computer executable instructions configured for:
displaying a table in a graphical editor, wherein multiple elements of the table overlap and share a common space in the graphical editor such that only a top element is initially visible and lower elements are initially not visible in the common space in the graphical editor;
invoking a visual affordance that opens a zoom window, wherein the visual affordance is displayed in an upper corner of the top element;
displaying the visual affordance and the zoom window in an area in the graphical editor where the multiple elements overlap, wherein the zoom window displays a modified visual representation that is modified to show overlapping multiple elements of the table that are not initially visible in the graphical editor, wherein the modified visual representation contemporaneously displays all of the multiple elements of the table, wherein each of the multiple elements are displayed as a same relative size to one another, wherein the modified visual representation is automatically sized according to a quantity of elements in the table that are displayed in the modified visual representation, and wherein the modified visual representation that shows a greater number of elements in the table is larger than the modified visual representation that shows a lesser number of elements in the table;
while presenting the modified visual representation, visually splitting apart elements that have a shared border when displayed in the common space of the graphical editor, wherein the elements that have the shared border were displayed, in the common space of the graphical editor before invoking the zoom window and before visually splitting apart the elements of the table, in a manner such that only a view of the top element was visible;
labeling and color-coding every element in the table according to a logical order of the elements of the table;
automatically presenting a label and color-coding for each element in the table in the modified visual representation; and
reordering a visual representation of a visual top-to-bottom order of the elements by receiving a drag-and-drop of a selected element from an original position to a user-selected hierarchical position in the table, wherein the logical order of the elements remains unchanged and does not correspond with the visual top-to-bottom order, and wherein previously obscured elements of the table are visible while the reordering is performed.

* * * * *